US010003617B2

(12) United States Patent
Hong et al.

(10) Patent No.: US 10,003,617 B2
(45) Date of Patent: Jun. 19, 2018

(54) TERMINAL AND APPLICATION SYNCHRONIZATION METHOD THEREOF

(71) Applicant: Samsung Electronics Co., Ltd., Suwon-si, Gyeonggi-do (KR)

(72) Inventors: Youngki Hong, Seoul (KR); Killyeon Kim, Suwon-si (KR); Yongseok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 14/208,498

(22) Filed: Mar. 13, 2014

(65) Prior Publication Data
US 2014/0281038 A1    Sep. 18, 2014

(30) Foreign Application Priority Data

Mar. 14, 2013 (KR) .......................... 10-2013-0027513

(51) Int. Cl.
*H04L 29/06* (2006.01)
*H04L 29/08* (2006.01)

(52) U.S. Cl.
CPC ...... *H04L 65/1066* (2013.01); *H04L 67/1095* (2013.01)

(58) Field of Classification Search
CPC .................................................. H04L 65/1066
USPC ............................................................ 709/248
See application file for complete search history.

(56) References Cited

U.S. PATENT DOCUMENTS

| 3,763,317 A | * | 10/1973 | Coleman, Jr. | ............ H04N 5/95 327/154 |
| 3,801,956 A | * | 4/1974 | Braun | ..................... G06F 17/15 375/343 |
| 4,124,778 A | * | 11/1978 | Amass | .................. H04J 3/0602 341/70 |
| 4,443,883 A | * | 4/1984 | Berger | ................... G11B 20/10 360/40 |

(Continued)

FOREIGN PATENT DOCUMENTS

| CN | 1744122 A | 3/2006 |
| CN | 102224720 A | 10/2011 |
| KR | 10-2013-0024801 A | 3/2013 |

OTHER PUBLICATIONS

Merriam-Webster, "register", 2016.*

(Continued)

*Primary Examiner* — O. C. Vostal
(74) *Attorney, Agent, or Firm* — Jefferson IP Law, LLP

(57) ABSTRACT

An application synchronization method for use in a terminal is provided. The application synchronization method includes acquiring an alarm registration request of a first repetitive synchronization operation, acquiring a next execution time of a second repetitive synchronization operation associated with a same application as an application of the first repetitive synchronization operation, adjusting, if a difference between an alarm time of the alarm registration request of the first repetitive synchronization operation and the next execution time of the second repetitive synchronization operation is less than or equal to a threshold value, the alarm time of the alarm registration request of the first repetitive synchronization operation according to the next execution time of the second repetitive synchronization operation, and registering the adjusted alarm time.

18 Claims, 7 Drawing Sheets

(56) References Cited

U.S. PATENT DOCUMENTS

| | | | | |
|---|---|---|---|---|
| 4,803,703 | A * | 2/1989 | DeLuca | H04W 88/026 370/350 |
| 4,994,916 | A * | 2/1991 | Pshtissky | G08B 13/19634 348/159 |
| 5,059,926 | A * | 10/1991 | Karczewski | H03L 7/06 331/172 |
| 5,208,833 | A * | 5/1993 | Erhart | H04L 25/4917 375/294 |
| 5,276,876 | A * | 1/1994 | Coleman | G06F 9/466 709/226 |
| 5,721,733 | A * | 2/1998 | Wang | H04L 1/1848 370/332 |
| 5,751,721 | A * | 5/1998 | Bloks | H04J 3/0655 370/509 |
| 5,793,772 | A * | 8/1998 | Burke | H04H 60/94 370/508 |
| 6,687,756 | B1 * | 2/2004 | Rawson, III | G06F 1/10 709/248 |
| 7,227,394 | B2 * | 6/2007 | Molho | H03L 7/091 327/158 |
| 7,280,565 | B2 * | 10/2007 | Franke | G05B 19/042 370/530 |
| 7,606,837 | B2 * | 10/2009 | Shields | H04L 67/1095 |
| 7,747,561 | B1 * | 6/2010 | Gupta | G06F 17/30578 |
| 7,752,165 | B2 * | 7/2010 | Ireland | G06F 17/30575 707/609 |
| 7,885,925 | B1 * | 2/2011 | Strong | G06F 17/30038 707/620 |
| 7,970,017 | B2 * | 6/2011 | O'Neil | H04L 67/104 370/503 |
| 8,495,020 | B1 * | 7/2013 | Nasserbakht | G06F 15/7807 707/640 |
| 8,549,437 | B2 * | 10/2013 | Neubrand | H04N 1/00204 370/464 |
| 8,694,686 | B2 * | 4/2014 | Roth | H04L 67/306 709/203 |
| 8,699,406 | B1 * | 4/2014 | Charles | H04L 7/048 370/324 |
| 8,738,925 | B1 * | 5/2014 | Park | H04B 7/26 380/270 |
| 9,231,969 | B1 * | 1/2016 | Satish | H04L 63/1433 |
| 2002/0026474 | A1 * | 2/2002 | Wang | G06F 9/445 709/203 |
| 2002/0065946 | A1 * | 5/2002 | Narayan | G06F 9/548 719/315 |
| 2003/0005161 | A1 * | 1/2003 | Chen | G06F 17/30575 709/248 |
| 2003/0014678 | A1 * | 1/2003 | Ozcetin | G06F 1/14 713/400 |
| 2003/0014679 | A1 * | 1/2003 | Domon | G06F 1/14 713/400 |
| 2003/0026295 | A1 * | 2/2003 | Baum | H04L 27/2662 370/503 |
| 2003/0050078 | A1 * | 3/2003 | Motegi | H04W 60/04 455/456.1 |
| 2003/0069874 | A1 * | 4/2003 | Hertzog | G06Q 10/109 |
| 2003/0151572 | A1 * | 8/2003 | Kumada | G09G 3/3614 345/87 |
| 2003/0174796 | A1 * | 9/2003 | Isozaki | H04L 29/06027 375/354 |
| 2003/0190002 | A1 * | 10/2003 | Azakami | H04H 40/18 375/368 |
| 2004/0142711 | A1 * | 7/2004 | Mahonen | H04M 1/72527 455/502 |
| 2004/0205263 | A1 * | 10/2004 | Sivaraman | G06F 17/30578 710/21 |
| 2004/0213295 | A1 * | 10/2004 | Fehr | H04W 4/04 370/503 |
| 2005/0044235 | A1 * | 2/2005 | Balahura | G06F 17/30578 709/227 |
| 2005/0050142 | A1 * | 3/2005 | Capone | G06F 17/30581 709/204 |
| 2005/0114431 | A1 * | 5/2005 | Singh | G06F 17/30575 709/201 |
| 2005/0258949 | A1 * | 11/2005 | Iwazumi | B60C 23/0408 340/442 |
| 2006/0080363 | A1 * | 4/2006 | Vadlamani | G06Q 10/10 |
| 2006/0098721 | A1 * | 5/2006 | Rabaeijs | G01S 19/30 375/150 |
| 2006/0251046 | A1 * | 11/2006 | Fujiwara | H04L 12/40052 370/350 |
| 2006/0281476 | A1 * | 12/2006 | Lane | H04B 7/2125 455/502 |
| 2007/0016362 | A1 * | 1/2007 | Nelson | G01C 21/362 701/425 |
| 2007/0050561 | A1 * | 3/2007 | Alsup | G06F 9/3004 711/145 |
| 2007/0087791 | A1 * | 4/2007 | Feeney | A63F 13/12 455/567 |
| 2007/0130541 | A1 * | 6/2007 | Louch | G06F 3/04817 715/804 |
| 2007/0198745 | A1 * | 8/2007 | Fornari | H04L 67/1095 709/248 |
| 2008/0155009 | A1 * | 6/2008 | Jensen | G06Q 40/06 709/202 |
| 2008/0155525 | A1 * | 6/2008 | Ho | G06F 17/30578 717/168 |
| 2008/0313355 | A1 * | 12/2008 | Prasad | G06F 17/30575 709/248 |
| 2009/0310729 | A1 * | 12/2009 | Liu | G06F 5/06 375/376 |
| 2010/0058097 | A1 * | 3/2010 | Foster | G06F 1/10 713/400 |
| 2010/0067553 | A1 * | 3/2010 | McKinney | H04J 3/0664 370/503 |
| 2010/0100641 | A1 * | 4/2010 | Quinlan | G06F 9/52 709/248 |
| 2010/0145910 | A1 * | 6/2010 | Zhao | G06F 17/30348 707/620 |
| 2010/0151850 | A1 * | 6/2010 | Majmundar | H04L 67/36 455/423 |
| 2010/0250986 | A1 * | 9/2010 | Black | G06F 1/3203 713/323 |
| 2010/0257280 | A1 * | 10/2010 | Stokking | H04L 65/80 709/231 |
| 2010/0299455 | A1 * | 11/2010 | Master | H04W 52/0216 709/248 |
| 2011/0016536 | A1 * | 1/2011 | O'Brien | G06Q 20/02 726/28 |
| 2011/0087802 | A1 * | 4/2011 | Witriol | G06F 17/30575 709/248 |
| 2011/0185202 | A1 * | 7/2011 | Black | H04W 52/0258 713/320 |
| 2011/0185216 | A1 * | 7/2011 | Zhao | G06F 1/14 713/401 |
| 2011/0199905 | A1 * | 8/2011 | Pinheiro | H04W 4/005 370/235 |
| 2011/0264808 | A1 | 10/2011 | Eriksson | |
| 2011/0295957 | A1 * | 12/2011 | Ananthanarayanan | H04L 67/24 709/206 |
| 2012/0011399 | A1 * | 1/2012 | Park | G06F 11/1443 714/16 |
| 2012/0036250 | A1 * | 2/2012 | Vaswani | G01D 4/004 709/224 |
| 2012/0066411 | A1 * | 3/2012 | Jeide | H04L 67/1095 709/248 |
| 2012/0079095 | A1 * | 3/2012 | Evans | G06F 8/61 709/224 |
| 2012/0131095 | A1 | 5/2012 | Luna et al. | |
| 2012/0142279 | A1 * | 6/2012 | Okuda | H04L 1/189 455/68 |
| 2012/0176172 | A1 * | 7/2012 | Webb, III | G06F 1/0321 327/164 |
| 2012/0203932 | A1 * | 8/2012 | da Costa | H04L 67/10 709/248 |
| 2012/0207183 | A1 * | 8/2012 | Bobrek | H04J 3/0641 370/511 |

(56) References Cited

U.S. PATENT DOCUMENTS

| | | | |
|---|---|---|---|
| 2012/0246343 A1* | 9/2012 | Story, Jr. | G06F 17/30575 709/248 |
| 2012/0284426 A1* | 11/2012 | Smith | H04W 4/00 709/248 |
| 2012/0294397 A1* | 11/2012 | Umeda | H04L 27/227 375/343 |
| 2012/0324540 A1* | 12/2012 | Wu | G06F 1/163 726/4 |
| 2013/0041747 A1* | 2/2013 | Anderson | G06Q 10/10 705/14.39 |
| 2013/0055273 A1* | 2/2013 | Hong | H04L 67/325 718/102 |
| 2013/0064308 A1* | 3/2013 | Nemiroff | H04N 21/23439 375/240.28 |
| 2013/0124723 A1* | 5/2013 | Bao | H04L 65/1016 709/224 |
| 2013/0246575 A1* | 9/2013 | Giaretta | H04L 41/00 709/218 |
| 2013/0315266 A1* | 11/2013 | Chen | H04L 7/042 370/517 |
| 2014/0019901 A1* | 1/2014 | Powell | A61B 5/0006 715/771 |
| 2014/0103104 A1* | 4/2014 | Jover | H04N 21/4126 235/375 |
| 2014/0120961 A1* | 5/2014 | Buck | H04W 4/12 455/466 |
| 2014/0207734 A1* | 7/2014 | Lin | G06F 17/30174 707/610 |
| 2014/0215535 A1* | 7/2014 | Elliott | H04N 21/2387 725/81 |
| 2014/0258703 A1* | 9/2014 | Vanturennout | G06F 9/4406 713/100 |

OTHER PUBLICATIONS

Schulzrinne et al., "RTP: A Transport Protocol for Real-Time Applications", RFC 3550, 2003.*
Choi et al., "Deterministic Replay of Java Multithreaded Applications", 1998.*
Gupta et al., "The Impact of Operating System Scheduling Policies and Synchronization Methods on the Performance of Parallel Applications", 1991.*
Microsoft Computer Dictionary, "feedback", 5th Edition, 2002, p. 209.*
Jacoby et al., "Effective Reporting (ER) for Mobile Host-based Security and Forensics", 2007.*
Kopetz et al., "Clock Synchronization in Distributed Real-Time Systems", 1987.*
Kudo et al., "New Remote Maintenance System (RMS) for Distributed Control System (DCS)", 2006.*
Merriam-Webster, "processor", 2014.*
Microsoft, "ActiveSync (Windows CE 5.0)", 2006.*
Microsoft, "ActiveSync Overview (Windows CE 5.0)", 2006.*
Mock et al., "Continuous Clock Synchronization in Wireless Real-Time Applications", 2000.*
Rashkovska et al., "A Telemedicine Application: ECG Data from Wireless Body Sensors on a Smartphone", 2011.*
Ruff, "Applied Computer Science Problems Clock and State Synchronization", 2005.*
Ruff, "Basics of how Sync Services Works", 2001-2015.*
Chinese Office Action dated Feb. 2, 2018, issued in Chinese Office Action No. 201480014301.8.

* cited by examiner

TERMINAL AND APPLICATION SYNCHRONIZATION METHOD THEREOF

CROSS-REFERENCE TO RELATED APPLICATION(S)

This application claims the benefit under 35 U.S.C. § 119(a) of a Korean patent application filed on Mar. 14, 2013 in the Korean Intellectual Property Office and assigned Serial number 10-2013-0027513, the entire disclosure of which is hereby incorporated by reference.

TECHNICAL FIELD

The present disclosure relates to an application management method. More particularly, the present disclosure relates to an application synchronization method of a terminal.

BACKGROUND

With the advances of technology, the mobile communication system has evolved to the level of providing various data communication services beyond early voice-oriented services. Particularly with the introduction of enhanced terminals, such as a smartphone, and an enhanced data rate network, users are capable of enjoying various data services anytime anywhere.

The enhanced terminal, such as a smartphone, supports various applications such as a mail client, a Social Network Service (SNS) client, and an Instant Messaging (IM) client. These applications are capable of connecting to a network to synchronize application data with a network entity (server). In order to achieve the synchronization of application data, the applications perform data synchronization at respective intervals configured according to the user's preference. Although it is typical to set the synchronization interval to 5 minutes, 15 minutes, 30 minutes, 1 hour, 4 hour, or the like, the synchronization interval for each application maybe set freely according to the user's intention. If the user wants to receive the data updated in real time, it is preferred to set the synchronization interval to a small value. Otherwise, if the user wants to conserve the communication resource and battery power, it may be preferred to set the synchronization interval to a longer interval.

The enhanced terminal transmits an updated data request message to the network entity (server) at an interval configured for the corresponding application. In response to the updated data request message, the server transmits the requested data to the enhanced terminal.

If the enhanced terminal is not in the state requiring communication, it is preferred to operate in an idle mode to reduce power consumption. Whenever the individual applications perform an update, the terminal has to transition from the idle mode to an active mode. Accordingly, if a plurality of applications are running with their respective synchronization intervals, the transition between the idle mode and the active mode may occur frequently. Likewise, if an application is running at least two repetitive operations configured, with two different synchronization intervals, this also causes the same problems as the at least two applications running with different synchronization intervals.

FIG. 1 is a diagram illustrating a synchronization process in a technology according to the related art.

Referring to FIG. 1, accounts, A, B, and C are registered with the mail client. Each account is configured to perform synchronization operation at an interval of 15 minutes. The account A starts the synchronization operation at time 3600 seconds and ends the synchronization operation at time 3605 seconds. An alarm is registered to start the synchronization operation for the account A after 15 minutes since the time of the end of synchronization. Afterward, the synchronization operation for account A restarts at time 4505 seconds. Similar operations are performed for accounts B and C.

After 8 seconds since the first synchronization operation for account A ends, the synchronization operation for account B restarts. In the entire synchronization process for one application, i.e. the mail client, the idle times between two consecutive synchronization operations are 8 seconds, 5 seconds, 14 minutes 35 seconds, 10 seconds, and 14 minutes and 33 seconds.

According to the conventional technology as described above, when a plurality of accounts are registered with the mail client and the accounts are configured with different synchronization intervals, the accounts have to perform synchronization at different times. Accordingly, the application (mail client) running on the terminal has to perform the synchronization operations of the plural accounts irregularly and non-periodically. In this case, the terminal has to transition between the idle mode and active mode for every synchronization operation. As the number of mode transition times increases, this increases the signaling overhead and power consumption. For example, in the $3^{rd}$ Generation (3G) Wide Band Code Division Multiple Access (WCDMA) system, 35 controls messages are exchanged for Preservation mode transition and Radio Access Bearer (RAB) reconfiguration.

Accordingly, a method for synchronizing applications efficiently is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for synchronizing applications efficiently.

In accordance with an aspect of the present disclosure, an application synchronization method of a terminal is provided. The application synchronization method includes acquiring an alarm registration request of a first repetitive synchronization operation, acquiring a next execution time of a second repetitive synchronization operation associated with a same application as an application of the first repetitive synchronization operation, adjusting, when a difference between an alarm time of the alarm registration request of the first repetitive synchronization operation and the next execution time of the second repetitive synchronization operation is less than or equal to a threshold value, the alarm time of the alarm registration request of the first repetitive synchronization operation according to the next execution time of the second repetitive synchronization operation, and registering the adjusted alarm time.

In accordance with another aspect of the present disclosure, a terminal is provided. The terminal includes a control unit configured to acquire an alarm registration request of a first repetitive synchronization operation and a next execution time of a second repetitive synchronization operation associated with a same application as an application of the first repetitive synchronization operation, to adjust, when a difference between an alarm time of the alarm registration request of the first repetitive synchronization operation and the next execution time of the second repetitive synchronization operation is less than or equal to a threshold value, the alarm time of the alarm registration request of the first repetitive synchronization operation according to the next execution time of the second repetitive synchronization operation, and to register the adjusted alarm time and a communication unit configured to transmit and receive data necessary for synchronization under the control of the control unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
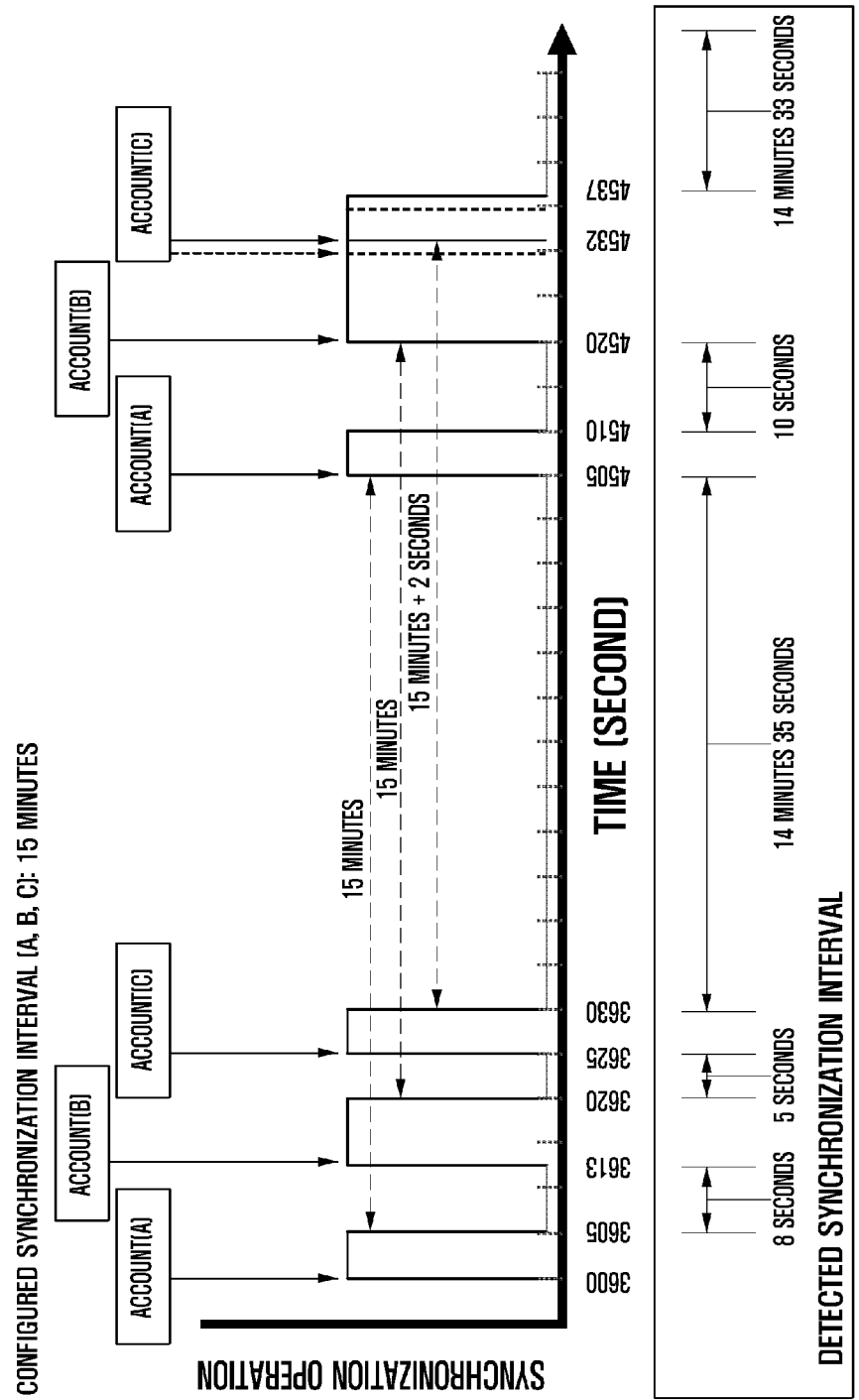
FIG. 1 is a diagram illustrating a synchronization process in a technology according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those illustrated in drawings, in practice. The same reference numbers are used throughout the drawings to refer to the same or like parts.

In the following description, a single synchronization operation denotes a one-time synchronization operation. For example, the synchronization operation of account A which starts at time 3600 seconds and ends at time 3605 is a one-time synchronization operation.

In the following description, a repetitive synchronization operation denotes a set of one-time synchronization operations occurring repeatedly. For example, if a synchronization operation of account A occurs at an interval of 15 minutes, the synchronization operations occurring repeatedly is regarded as one repetitive synchronization operation. A set of the synchronization operations of account B is another repetitive synchronization operation. Each repetitive synchronization operation has a unique identifier.

In the following description, a synchronization operation may refer to a single synchronization operation and may refer to a repetitive synchronization operation. That is, the synchronization operation may include a single synchronization operation and a repetitive synchronization operation.

Figure 2:
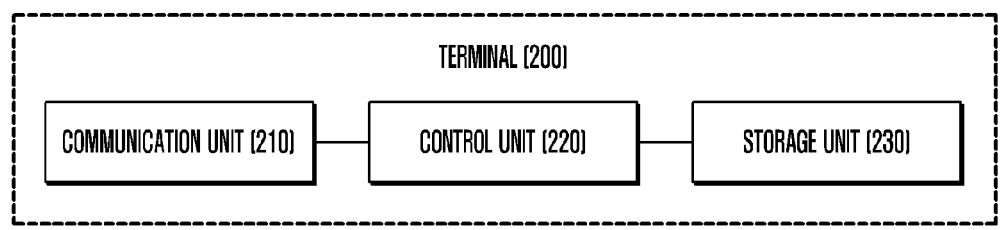
FIG. 2 is a block diagram illustrating a configuration of a terminal 200 according to an embodiment of the present disclosure.

FIG. 2 is a block diagram illustrating a configuration of a terminal 200 according to an embodiment of the present disclosure.

Referring to FIG. 2, the terminal 200 according to an embodiment of the present disclosure includes a communication unit 210, a control unit 220, and a storage unit 230. The control unit 200 controls overall operations of the terminal 200 according to one of the following various embodiments. Particularly in an embodiment, the control unit 220 estimates the intervals of individual repetitive synchronization operations and adjust the start times of the synchronization operations based on the estimation result according to an embodiment of the present disclosure. The control unit 220 stores the data necessary for use in adjusting the start times of the synchronization operations in the storage unit 230. The communication unit 210 communicates with a network entity such as server to exchange the data and/or signal necessary for use in the synchronization operation under the control of the control unit 220.

Although not illustrated in FIG. 2, the terminal 200 may further include an input unit for receiving a key input and/or touch input made by the user and/or a display unit for displaying/presenting information to the user.

Descriptions are made of the detailed operations of the components of the terminal of FIG. 2 in detail hereinafter with reference to FIGS. 3 to 7.

Figure 3:
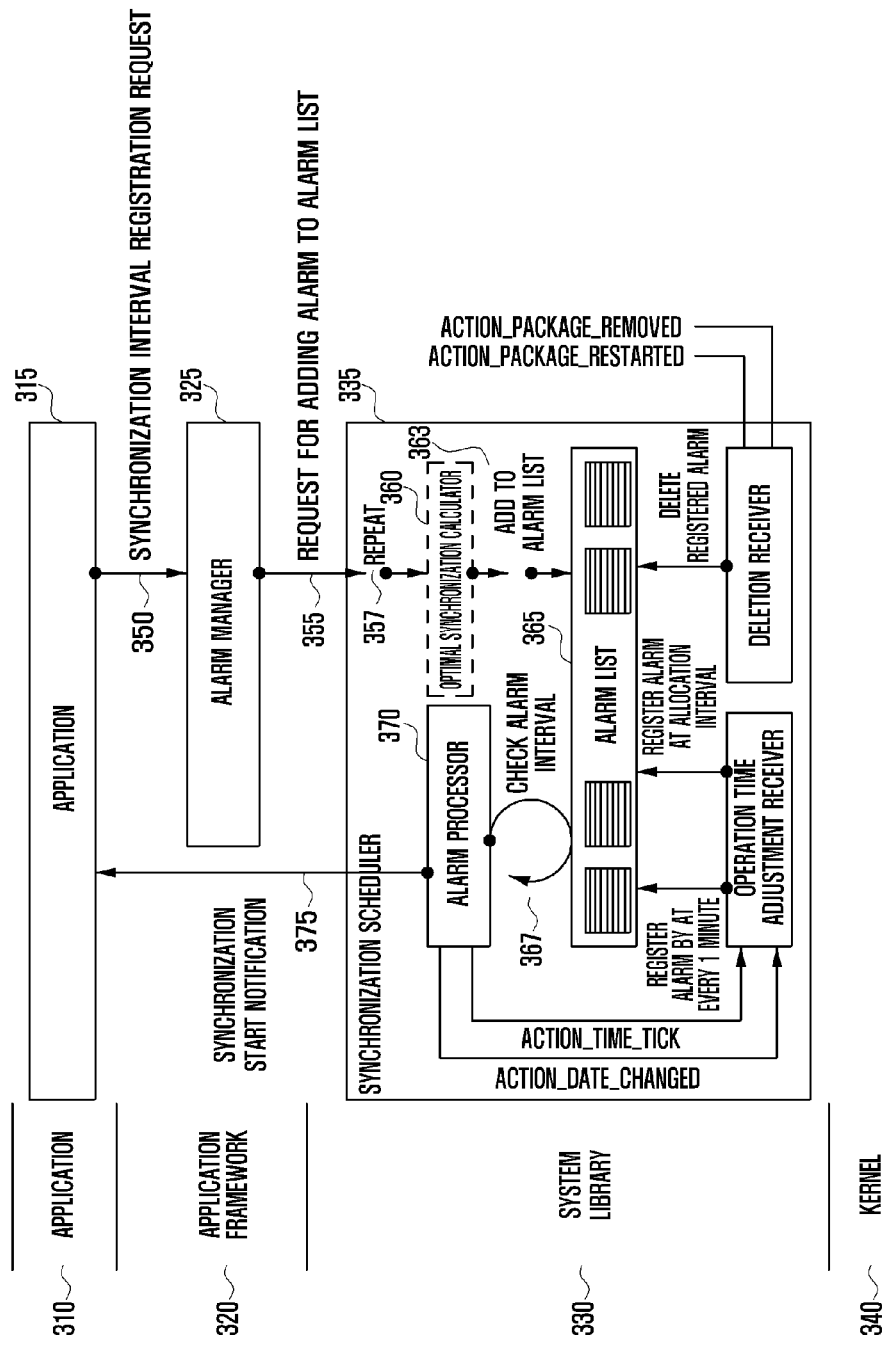
FIG. 3 is a diagram illustrating a configuration of an operating system of a control unit according to an embodiment of the present disclosure.

FIG. 3 is a diagram illustrating a configuration of an operating system of the control unit 220 according to an embodiment of the present disclosure.

Referring to FIG. 3, the operating system of the control unit 220 includes an application layer 310, an application framework layer 320, a system library layer 330, and a kernel layer 340.

The application layer 310 is the layer on which applications 315 are running. The application framework layer 320 is a set of classes and libraries implementing application program standard structure for a specific operating system. That is, the application framework 320 manages the lifecycle of the application 315 and provides event handling and application control function. The application framework layer 320 may include the alarm manager 325 which requests for synchronization of the update period of the application 315.

The system library layer 330 is a set of data sets and files sets memorizing the parts of the operating system. The system library layer 330 includes a synchronization scheduler 335 for synchronizing the synchronization interval of the application 315 running on the application layer 310.

The kernel layer 340 is a core responsible for interrupt handling, process management, memory management, and system management, and proving programming interface and basic functions of the operation system. Accordingly, the kernel 340 is loaded in the memory to which normal access is barred. That is, the kernel may be considered as an application for controlling hardware.

The above layer-structured control unit 220 may operate as follows.

The application layer 310 sends the application framework layer 320 a synchronization period registration request for synchronization operation of the registered application 315 at operation 350. The alarm manager 325 requests the synchronization scheduler 335 to add an alarm item to the alarm list at operation 355. This process is performed repeatedly whenever the synchronization operation is registered at operation 357.

An optimal synchronization calculator 360 of the synchronization scheduler 335 calculates a synchronization interval of the repetitive synchronization operation associated with the requested synchronization operation requested according to the following embodiment and adds the calculated synchronization interval to the alarm list 365 at operation 363. The synchronization scheduler 335 determines the scheduling synchronization interval stored in the alarm list at operation 367, and the alarm processor 370 determines the alarm interval for alarming the application layer 310. When the alarm time arrives, the synchronization scheduler 335 alarms the application layer 310 of the synchronization alarm of the application at operation 375.

The optimal synchronization calculator 360 may adjust the start times of the synchronization operations of the same application such that the synchronization operations are processes at the same timing and/or consecutively.

The optimal synchronization calculator 360 may be a component of the synchronization scheduler 335 and/or an independent component separated from the synchronization scheduler 335.

Figure 4:
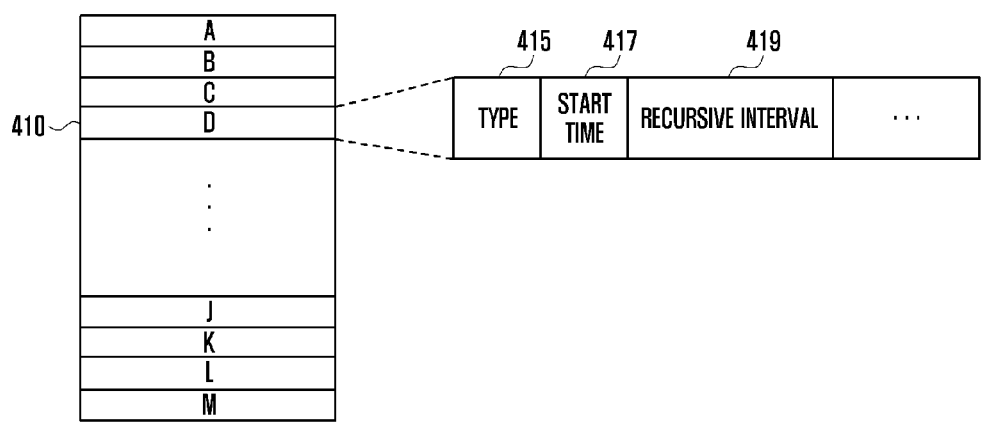
FIG. 4 is a diagram illustrating a configuration of an alarm list according to an embodiment of the present disclosure.

FIG. 4 is a diagram illustrating a configuration of an alarm list according to an embodiment of the present disclosure.

Referring to FIG. 4, the alarm list that is stored in the storage unit 230 includes a record 410 corresponding to each repetitive synchronization operation. One record 410 corresponds to one repetitive synchronization operation. Each record may include a type field 415, a start time (when) field 417, and a scheduling synchronization interval (repeat interval) field 419. The type field 417 contains the information on the method for configuring the alarm notifying of the update interval with the information on whether to use absolute time (UTC) and/or relative time (e.g. after 5 minutes and 10 minutes). The information contained in the type field 415 represented by ELAPSED_REALTIME_WAKEUP or RTC_WAKEUP. The ELAPSED_REALTIME_WAKEUP is the information for use in determining the alarm trigger time since the current time. RTC_WAKEUP is the time acquired from the network for use in determining the alarm trigger time based on the absolute time.

The start time 417 denotes the time for starting the first synchronization operation of the repetitive synchronization operation since the repetitive synchronization operation's registration. The repeat interval 419 is the information on the interval of the repetitive synchronization operation.

Each record 410 may include the identifier for use in identifying the repetitive synchronization operation corresponding thereto. The record 410 may include a final synchronization time of the corresponding repetitive synchronization operation.

According to an alternative embodiment, some fields may be stored in different records other than all of the fields as illustrated in FIG. 4 are stored in one record. In this case, the two records having the same repetitive synchronization operation identifier may be combined into one record to give an effect of the record as illustrated in FIG. 4.

If the application 315 is running with a plurality of repetitive synchronization operations, the application 315 sends the synchronization scheduler 335 an alarm registration request whenever the synchronization operation is required. The alarm registration request includes the repetitive synchronization operation identifier, but not any information on the interval. If the alarm time arrives, the synchronization scheduler 335 sends the application 315 the synchronization operation start notification including the information exemplified in Table 1. The synchronization operation start notification is also referred to as an alarm notification.

TABLE 1

| alarm-registered repetitive synchronization operation identifier | Sync Status Info |
| --- | --- |
| First repetitive synchronization operation identifier | First final synchronization time |
| Second repetitive synchronization operation identifier | Second final synchronization time |
| Third repetitive synchronization operation identifier | Third final synchronization time |
| . . . | . . . |

The alarm-registered repetitive synchronization operation identifier is the identifier of the repetitive synchronization operation of which synchronization time has currently arrived. That is, if any of the alarm identifiers of Table 1 is received, the application 315 performs synchronization operation corresponding to the alarm-registered repetitive synchronization operation identifier. In a case of the mail client application, the repetitive synchronization operation for a specific account may be identified using one repetitive synchronization operation identifier. The repetitive synchronization operation of another account may have another unique repetitive synchronization operation identifier.

In addition, the notification of Table 1 includes the information on the alarm-registered repetitive synchronization operation and other synchronization operations. The notification of Table 1 stores the identifiers of the respective synchronization operations in association with the last synchronization times (e.g. completion time) of the repetitive synchronization operations corresponding to the identifiers. The information of Table 1 is characterized in that if the synchronization scheduler 335 cannot read the information of Table 1 at the time when the alarm registration is requested initially, i.e. when other applications with the exception of the application 310 which has registered the alarm cannot read the alarm, the synchronization scheduler 335 may be allowed to read the information of Table 1 when the feedback (re-notification) information of the successful notification completion with the generation of the alarm notification. If the synchronization scheduler 335 is able to read the information at the time when the alarm registration is requested, the information of Table 1 may be read at the time when the alarm registration is requested.

Figure 5:
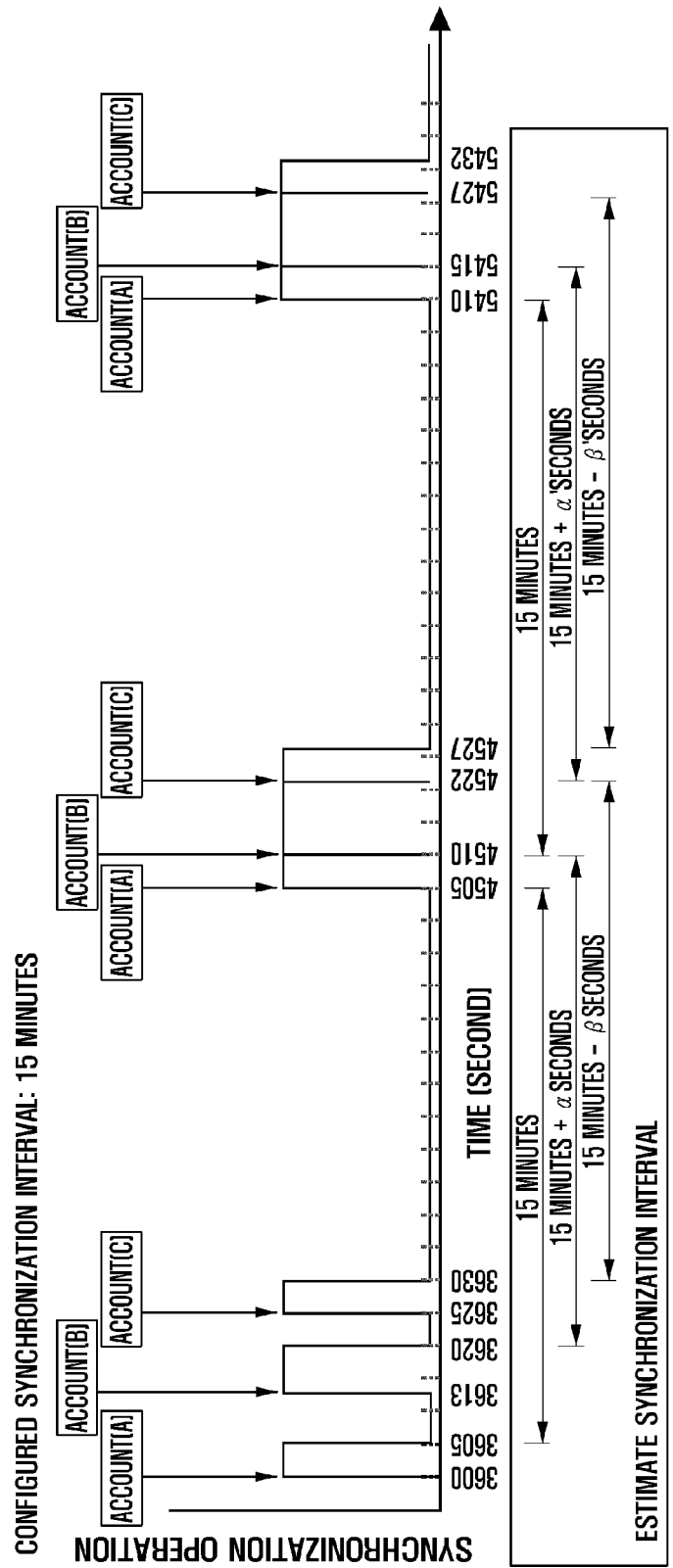
FIG. 5 is a diagram illustrating a synchronization procedure according to an embodiment of the present disclosure.

FIG. 5 is a diagram illustrating the synchronization procedure according to an embodiment of the present disclosure.

In the embodiment of FIG. 5, the application 315 is a mail client. The mail client 315 has three accounts (accounts A, B, and C) registered therewith. The accounts are configured to perform synchronization at an interval of 15 minutes at the application level. However, the alarm registration request message transmitted from the application 315 to the synchronization scheduler 335 does not include the information on the interval as described above. Accordingly, it is necessary for the synchronization scheduler 335 and/or a separate component to estimate the individual repetitive synchronization operation intervals. The synchronization operation interval estimation procedure is described with reference to FIG. 6.

Figure 6:
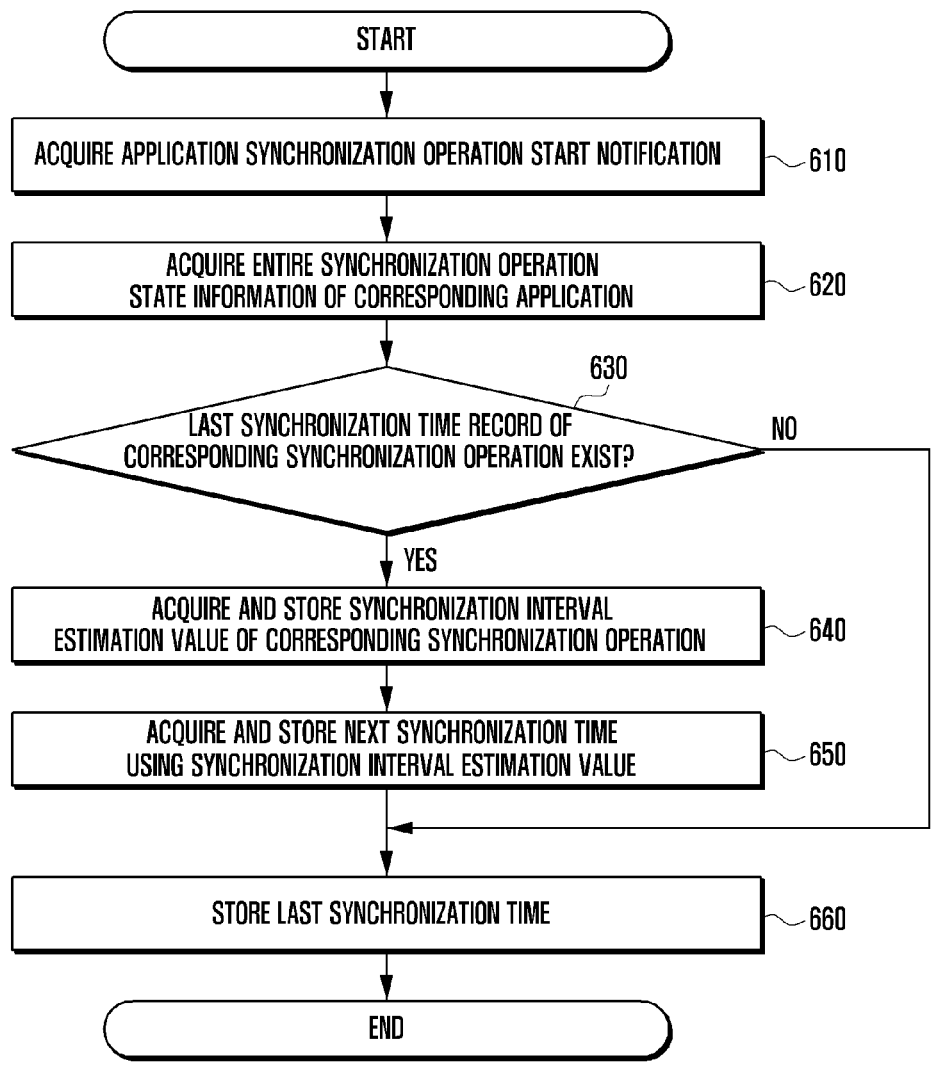
FIG. 6 is a flowchart illustrating a synchronization interval estimation procedure according to an embodiment of the present disclosure.

FIG. 6 is a flowchart illustrating a synchronization interval estimation procedure according to an embodiment of the present disclosure.

Referring to FIG. 6, the control unit 220 acquires a synchronization operation start notification including the information in the form as exemplified in Table 1 or similar information at operation 610. The synchronization operation start notification includes the information on the final operation end times of other synchronization operations as well as the information on the start time of the corresponding synchronization operation.

Referring to FIG. 5, a synchronization operation of account A starts at time 3600 seconds and ends at time 3605 seconds. At the synchronization start time 3600 seconds of account A, the control unit 220 may acquire the synchronization start notification. The control unit 220 acquires the status information of all the synchronization operations of the corresponding application from the synchronization operation start notification at operation 620. For example, the control unit 220 may acquire the information on the times when the synchronization operations of accounts A, B and C have completed from the synchronization operation start notification.

The control unit 220 determines whether there is any record on the final synchronization time of the synchronization start notification target repetitive synchronization operation at operation 630. The control unit 220 may determine the corresponding repetitive synchronization operation, e.g. final synchronization time of account A, from the synchronization start notification of Table 1. According to an alternative embodiment, the control unit 220 may record the synchronization time at operation 660 and determine the final synchronization time of account A using the recorded synchronization time. The control unit 220 may also determine the final synchronization time in the synchronization start notification and the final synchronization time recorded at operation 660 to take the latest one of the two final synchronization times. In the following description, it is assumed that both the final synchronization time indicated in the synchronization start notification and the final synchronization time recorded at operation 660 are used.

If there is no final synchronization time of the repetitive synchronization operation of account A in the synchronization start notification and there is no final synchronization time of the repetitive synchronization operation of account A which has been recorded at operation 630, the procedure goes to operation 660. At operation 660, the control unit 220 records the final synchronization time of account A. The final synchronization time may be one of the time when the corresponding synchronization start notification has been generated, the time when the repetitive synchronization operation has actually started, and the time when the repetitive synchronization operation has actually ended. In the case of recording the time when the repetitive synchronization operation ends, the control unit 220 may wait for the end of the synchronization operation and records, when the final synchronization operation has completed, the final synchronization time.

If the final synchronization time of the repetitive synchronization operation of account A is acquired from the synchronization start notification and the information recorded at operation 630, the procedure goes to operation 640.

At operation 640, the control unit 220 acquires and stores the synchronization interval estimation value using the synchronization start notification occurrence time and the final synchronization time of the corresponding repetitive synchronization operation. For example, if the value obtained by subtracting the final synchronization time of the corresponding repetitive synchronization operation from the synchronization start notification occurrence time may be the synchronization interval estimation value. The synchronization interval estimation value may be stored in the record as illustrated in FIG. 4. Also, in the cast that the synchronization scheduler 335 reads the information of Table 1 at the time when the alarm registration is requested, the difference between the time when the synchronization start notification occurs, i.e. next execution time of the corresponding synchronization operation, and the last synchronization time of the corresponding repetitive synchronization operation may become the synchronization estimation value of the corresponding repetitive synchronization operation.

At operation 650, the control unit 220 acquires and store the next synchronization time using the synchronization interval estimation value. For example, if the synchronization operation of account A ends at the time 3605 seconds and if the synchronization interval estimation value is 15 minutes (=900 seconds), the next synchronization time is (end time)+(interval estimation value)=4505 seconds. For example, the next synchronization time may be stored in the record as illustrated in FIG. 4. According to an alternative embodiment, the next synchronization may be estimated as (start time)+(interval estimation value). Afterward, operation 660 is performed as described above.

Through the procedure of FIG. 6, the final synchronization time of the repetitive synchronization operation is stored. If the corresponding repetitive synchronization operation has been performed previously, it is possible to acquire the synchronization interval estimation value and the next synchronization time estimation value. In the embodiment of FIG. 5, the same procedure may be perform for both the synchronization operation of account B starting at the time 3613 seconds and the synchronization operation of account C starting at the time 3625 seconds.

The embodiment of FIG. 6 shows an interval estimation procedure and may be replaced by a similar method of acquiring at least two synchronization operation execution times and difference between the two times.

Figure 7:
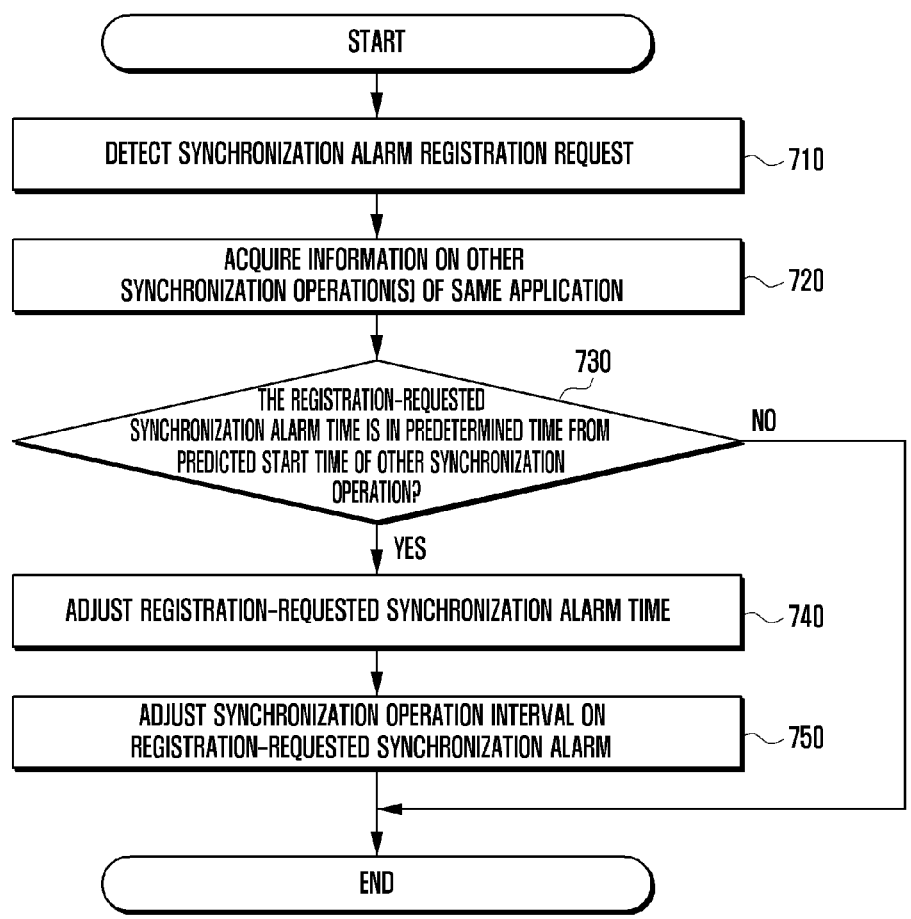
FIG. 7 is a flowchart illustrating an alarm configuration procedure according to an embodiment of the present disclosure.

FIG. 7 is a flowchart illustrating an alarm configuration procedure according to an embodiment of the present disclosure.

Referring to FIG. 7, the control unit 220 detects the synchronization alarm registration request output by the application 315 at operation 710. As described above, the synchronization alarm request includes only the repetitive synchronization operation identifier and synchronization time but not the interval information. For example, after the synchronization operation of account B has completed at the time 3620 seconds, the application 315 sets the synchronization operation time by adding the synchronization interval of 15 minutes (=900 seconds) to the end time, i.e. 4520 (=3620+900), and sends the synchronization alarm registration request to the synchronization scheduler 335.

At operation 720, the control unit 220 acquires the information on the other synchronization operation(s) of the same application. For example, a description is made of the case where an alarm registration request of the synchronization operation having the repetitive synchronization operation identifier is generated. For example, it is possible to acquire the next synchronization operation time 4505 seconds of the repetitive synchronization operation of account A at the synchronization operation end time 3620 seconds of account B. Also, it is possible to acquire the next synchronization operation time 4505 seconds or 4510 seconds of the repetitive synchronization operation of account A at the synchronization operation end time 3630 of account C.

At operation 730, the control unit 220 compares the synchronization alarm registration request time, i.e. the time 4520 seconds included in the alarm registration request of account B, and the next synchronization estimation time 4505 seconds (or 4510 seconds) of account B to determine whether the difference between two values is in the range of a determined threshold value. Assuming that the threshold value is 20, since the difference between the time values are 15 seconds which is less than the threshold value of 20 seconds, the procedure goes to operation 740. The comparison process is performed for all of the repetitive synchronization operations of the same application. If the difference between two values is greater than the threshold value, the alarm is registered without any adjustment.

At operation 740, the control unit 220 adjusts the synchronization alarm time requested for registration. For example, the control unit 220 may adjusts the next synchronization notification time of account B to be at 4505 seconds, identical with the next synchronization alarm time of account A. However, if the two synchronization operations cannot be performed simultaneously, the control unit 220 waits for the time (4510 seconds) when the synchronization operation of account A ends and notifies the application of the repetitive synchronization operation of account B. The control unit 220 may adjusts the synchronization operation execution time of account B such that the synchronization operation of account B is performed at the same time as or immediately after (within a time difference value) the synchronization operation of account A in a similar manner.

At operation 750, the control unit 220 adjusts the synchronization interval estimation value according to the result from operation 740. For example, since the synchronization operation of account B ends at time 3620 seconds and the next synchronization operation starts at time 4505 seconds, the synchronization interval estimation value becomes 885 seconds (=15 minutes−15 seconds). In the case that the next synchronization operation is configured to start at time 4510 seconds, the synchronization interval estimation value becomes 890 seconds (=15 minutes−10 seconds). The adjusted synchronization interval estimation value is store in the storage unit 230 in the form of a record as illustrated in FIG. 4.

According to the above procedure, in the case that an application is performing a plurality of synchronization operations as shown in FIG. 5, the control unit 220 may estimate that the synchronization interval of each repetitive synchronization operation is about 15 minutes through experimental learning. The control unit 220 also may identify the individual synchronization operation based on the estimated synchronization operation interval and control the start times of the plural repetitive synchronization operations such that the synchronization operations are performed simultaneously or at similar intervals (within an error range of $\alpha, \beta$, $\alpha'$, and $\beta'$).

As described above, when an application is running a plurality of repetitive synchronization operations without provision of information on the intervals of the repetitive synchronization operations, the control unit 220 estimates the synchronization intervals of the repetitive synchronization operations and controls the synchronization operation execution times such that the synchronization operations occur simultaneously or consecutively.

As a consequence, the application execution method of the present disclosure is capable of reducing the number of transitions between the idle and active modes which is caused by irregular synchronization operations of multiple applications or processes of the same application, thereby reducing unnecessary power consumption and the radio access network traffic load caused by frequent operation mode transmission without compromising the number of execution times of synchronization operations.

It will be understood that each block of the flowchart illustrations and/or block diagrams, and combinations of blocks in the flowchart illustrations and/or block diagrams, maybe implemented by computer program instructions. These computer program instructions may be provided to a processor of a general purpose computer, special purpose computer, or other programmable data processing apparatus to produce a machine, such that the instructions, which execute via the processor of the computer and/or other programmable data processing apparatus, create means for implementing the functions/acts specified in the flowchart and/or block diagram block and/or blocks. These computer program instructions may also be stored in a computer-readable memory that may direct a computer and/or other programmable data processing apparatus to function in a particular manner, such that the instructions stored in the computer-readable memory produce an article of manufacture including instruction means which implement the function/act specified in the flowchart and/or block diagram block and/or blocks. The computer program instructions may also be loaded onto a computer and/or other programmable data processing apparatus to cause a series of operational operations to be performed on the computer and/or other programmable apparatus to produce a computer implemented process such that the instructions which execute on the computer and/or other programmable apparatus provide operations for implementing the functions/acts specified in the flowchart and/or block diagram block and/or blocks.

Furthermore, the respective block diagrams may illustrate parts of modules, segments and/or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the various embodiments of the disclosure, means, but is not limited to, a software and/or hardware component, such as a Field Programmable Gate Array (FPGA) or Application Specific Integrated Circuit (ASIC), which performs certain operations. A module may advantageously be configured to reside on the addressable storage medium and configured to be executed on one or more processors. Thus, a module may include, by way of example, components, such as software components, object-oriented software components, class components and operation components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device and/or a secure multimedia card.

The terminal or mobile terminal according to an embodiment of the present disclosure may be implemented in any of various types of portable electronic devices including mobile phone, Personal Digital Assistant (PDA), navigation device, digital broadcast receiver, and Portable Multimedia Player (PMP).

It is to be appreciated that those skilled in the art may change or modify the various embodiments without departing the technical concept of this disclosure. Accordingly, it should be understood that above-described various embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

As described above, the terminal and application synchronization method thereof according to the present disclosure is advantageous in synchronizing applications efficiently.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An application synchronization method of a terminal, the method comprising:
    acquiring, by at least one processor of the terminal, synchronization information a second account of the application, when a synchronization alarm registration of a first account of the application is required;
    determining, by the at least one processor, whether a difference between a next synchronization time of the first account and a next synchronization time of the second account is within a predetermined time;
    adjusting, by the at least one processor, a next synchronization time and a synchronization period of the first account if the difference is within the predetermined time;
    registering, by the at least one processor, at least one of the adjusted next synchronization time and the synchronization period of the first account; and
    performing, by the at least one processor, a synchronization operation of the first account and the second account, when the next synchronization time of one of the first account and the second account arrives,
    wherein the adjusting of the next synchronization time of the first account includes setting the next synchronization time of the first account to be the same as the next synchronization time of the second account, if the synchronization operation of the first account and the second account can be performed consecutively.

2. The method of claim 1, wherein the adjusting of the next synchronization time of the first account includes setting the next synchronization time of the first account to be simultaneous with the next synchronization time of the second account, if the synchronization operation of the first account and the second account cannot be performed consecutively.

3. The method of claim 1, wherein the synchronization information includes the next synchronization time and a synchronization period of the second account.

4. The method of claim 1, further comprising registering, by the at least one processor, a type of the first account and a start time of the first account.

5. The method of claim 1, wherein the synchronization operation of the first account and the synchronization operation the second account correspond to different accounts of the application.

6. The method of claim 1, wherein the application is a single application.

7. The method of claim 1, wherein the application is an e-mail application.

8. The method of claim 7, wherein the synchronization operation of the first account and the synchronization operation the second account are operations of transmitting an update request message to a corresponding e-mail server.

9. The method of claim 8, wherein an e-mail server corresponding to the first account and an e-mail server corresponding to the second account are different e-mail servers.

10. A terminal comprising:
    at least one processor configured to:
        acquire synchronization information for a second account of the application, when a synchronization alarm registration of a first account of the application is required;
        determine whether a difference between a next synchronization time of the first account and a next synchronization time of the second account is within a predetermined time;
        adjust a next synchronization time and a synchronization period of the first account if the difference is within the predetermined time;
        register at least one of the adjusted next synchronization time of the first account and the synchronization period of the first account; and
        perform a synchronization operation of the first account and the second account, when the next synchronization time of one of the first account and the second account arrives,
    a transceiver, coupled to the at least one processor, configured to transmit and receive data necessary for synchronization of the application under the control of the at least one processor,
    wherein, to adjust the next synchronization time of the first account, the at least one processor is further configured to set the next synchronization time of the first account to be the same as the next synchronization time of the second account, if the synchronization operation of the first account and the second account can be performed consecutively.

11. The terminal of claim 10, wherein, to adjust the next synchronization time of the first account, the at least one processor is further configured to set the next synchronization time of the first account to be simultaneous with the next synchronization time of the second account, if the synchronization operation of the first account and the second account cannot be performed consecutively.

12. The terminal of claim 10, wherein the synchronization information includes the next synchronization time and a synchronization period of the second account.

13. The terminal of claim 10, wherein the at least one processor is further configured to register a type of the first account and a start time of the first account.

14. The terminal of claim 10, wherein the synchronization operation of the first account and the synchronization operation the second account correspond to different accounts of the application.

15. The terminal of claim 10, wherein the application is a single application.

16. The terminal of claim 10, wherein the application is an e-mail application.

17. The terminal of claim 16, wherein the synchronization operation of the first account and the synchronization operation the second account are operations of transmitting an update request message to a corresponding e-mail server.

18. The terminal of claim 17, wherein an e-mail server corresponding to the first account and an e-mail server corresponding to the second account are different e-mail servers.

* * * * *